United States Patent
Lee et al.

(10) Patent No.: US 9,703,941 B2
(45) Date of Patent: Jul. 11, 2017

(54) ELECTRONIC DEVICE WITH TOUCH SCREEN FOR FINGERPRINT RECOGNITION

(71) Applicant: Egis Technology Inc., Taipei (TW)

(72) Inventors: Jung-Chien Lee, Taipei (TW); Yuan-Lin Chiang, Taipei (TW)

(73) Assignee: Egis Technology Inc., Taipei (TW)

( * ) Notice: Subject to any disclaimer, the term of this patent is extended or adjusted under 35 U.S.C. 154(b) by 136 days.

(21) Appl. No.: 14/621,326

(22) Filed: Feb. 12, 2015

(65) Prior Publication Data

US 2016/0092018 A1    Mar. 31, 2016

(30) Foreign Application Priority Data

Sep. 29, 2014   (CN) .......................... 2014 1 0512762

(51) Int. Cl.
  *G06F 3/041*   (2006.01)
  *G06F 21/32*   (2013.01)
  *G06K 9/00*    (2006.01)

(52) U.S. Cl.
  CPC .......... *G06F 21/32* (2013.01); *G06K 9/00013* (2013.01)

(58) Field of Classification Search
  CPC ............... G06F 3/0416; G06F 3/04817; G06F 3/04842; G06F 3/04883; G06F 21/32; G06F 3/03547; G06F 2203/0338; G06F 3/0488; G06F 1/1626; G06F 21/30; G06F 21/31; G06F 2203/04104; G06F 2203/04112; G06K 9/00013
  See application file for complete search history.

(56) References Cited

U.S. PATENT DOCUMENTS

| | | | |
|---|---|---|---|
| 2007/0092118 | A1 | 4/2007 | Tachibana |
| 2010/0240415 | A1* | 9/2010 | Kim ............ G06F 3/03547 455/565 |
| 2015/0077362 | A1* | 3/2015 | Seo .................. G06F 3/041 345/173 |
| 2015/0133084 | A1* | 5/2015 | Baek ............. G06F 3/048 455/411 |
| 2015/0242673 | A1* | 8/2015 | Singhal ........ G06K 9/00013 345/174 |
| 2015/0277652 | A1* | 10/2015 | Kim ............... H04M 1/67 345/173 |
| 2016/0226666 | A1* | 8/2016 | Quirk ............. G06F 21/32 |

FOREIGN PATENT DOCUMENTS

CN    103176727 A    6/2013

* cited by examiner

*Primary Examiner* — Duc Quang Dinh

(57) ABSTRACT

An electronic device includes a touch screen having a sensing array with a plurality of sensors, a display panel having a displaying area and a processor. The sensing area of the sensing array is smaller than or equal to the displaying area. The processor determines whether a user's finger touches an icon displayed on the display panel, and the icon corresponds to an application. When the processor determines that the user's finger touches the icon, the electronic device controls a first sensing area of the sensing array corresponding to a first displaying area of the icon to enter a fingerprint sensing mode to capture a fingerprint image of the user's finger for fingerprint recognition. When the processor determines that fingerprint recognition is approved, the processor activates the application corresponding to the icon.

20 Claims, 5 Drawing Sheets

ELECTRONIC DEVICE WITH TOUCH SCREEN FOR FINGERPRINT RECOGNITION

CROSS REFERENCE TO RELATED APPLICATIONS

This Application claims priority of China Patent Application No. 201410512762.X, filed on Sep. 29, 2014, the entirety of which is incorporated by reference herein.

BACKGROUND OF THE INVENTION

Field of the Invention

The present invention relates to fingerprint recognition, and particularly, to an electronic device having a touch screen for fingerprint recognition and associated control method. The electronic device and control method thereof are capable of performing fingerprint recognition at any location on the surface of the touch screen.

Description of the Related Art

By using a fingerprint recognition mechanism on an electronic device (e.g. a cellular phone or tablet PC), it is more convenient for the user to use the electronic device since the manual input of an account and password can be omitted. Besides, the security can be promoted because the fingerprint is unique and cannot be stolen. Accordingly, electronic devices equipped with a fingerprint recognition apparatus have become more and more popular. These electronic devices may log onto various network services through fingerprint recognition when the user's finger is pressed on the fingerprint recognition apparatus deployed outside or on the touch screen. However, in prior technologies, when the fingerprint recognition apparatus is deployed outside the touch screen, the user usually has to find a specific location on which to press his finger and this can result in poor contact sensitivity at the specific location after a long period of usage. In addition, when the fingerprint recognition apparatus is deployed on a specific location on the touch screen in prior technologies, it can also result in poor contact sensitivity or cause damage to the specific location on the touch screen. Therefore the fingerprint recognition function cannot be performed normally and an extra maintenance cost will be incurred due to lower sensitivity.

BRIEF SUMMARY OF THE INVENTION

A detailed description is given in the following embodiments with reference to the accompanying drawings.

In an exemplary embodiment, an electronic device is provided. The electronic device includes: a touch screen having a sensing array with a plurality of sensors and a display panel having a displaying area; and a processor. The sensing area of the sensing array is smaller than or equal to the displaying area. The processor determines whether a user's finger touches an icon displayed on the display panel, wherein the icon corresponds to an application. When the processor determines that the user's finger touches the icon, the electronic device controls a first sensing area of the sensing array corresponding to a first displaying area of the icon to enter a fingerprint sensing mode to capture a fingerprint image of the user's finger for fingerprint recognition. When the processor determines that fingerprint recognition is approved, the processor activates the application corresponding to the icon.

In another exemplary embodiment, a fingerprint recognition method for use in an electronic device is provided. The electronic device comprises a touch screen comprising a sensing array and a display panel. The sensing array comprises a plurality of sensors, and the display panel comprises a displaying area, wherein a sensing area of the sensing array is smaller than or equal to the displaying area. The method comprises the steps of: determining whether a user's finger touches an icon displayed on the display panel, wherein the icon corresponds to an application; when it is determined that the user's finger touches the icon displayed on the display panel, controlling a first sensing area of the sensing array corresponding to a first displaying area of the icon to enter a fingerprint sensing mode to capture a fingerprint image of the user's finger for fingerprint recognition; and when it is determined that fingerprint recognition is approved, activating the application corresponding to the icon.

In yet another exemplary embodiment, an electronic device is provided. The electronic comprises: a touch screen and a processor. The touch screen has a sensing array, and a display panel. The sensing array comprises a plurality of sensors, and the display panel comprises a displaying area, wherein a sensing area of the sensing array is smaller than or equal to the displaying area. The processor displays a user interface on the display panel, wherein the user interface comprises a first area. The electronic device determines whether the user's finger touches the first area displayed on the display panel. When the electronic device determines that the user's finger touches the first area displayed on the display panel, the electronic device controls a first sensing area of the sensing array corresponding to a first displaying area of the first area to enter a fingerprint sensing mode to capture a fingerprint image of the user's finger for fingerprint recognition. When the processor determines that fingerprint recognition is approved, the processor executes a specific operation corresponding to the first area.

In yet another exemplary embodiment, a fingerprint recognition method for use in an electronic device is provided. The electronic device comprises a touch screen and a processor. The touch screen comprises a sensing array and a display panel. The sensing array comprises a plurality of sensors, and a sensing area of the sensing array is smaller than or equal to a displaying area of the display panel. The method comprises the steps of: displaying a user interface on the display panel, wherein the user interface comprises a first area; determining whether the user's finger touches the first area displayed on the display panel; when it is determined that the user's finger touches the first area displayed on the display panel, controlling a first sensing area of the sensing array corresponding to a first displaying area of the first area to enter a fingerprint sensing mode to capture a fingerprint image of the user's finger for fingerprint recognition; and when it is determined that fingerprint recognition is approved, executing a specific operation corresponding to the first area.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
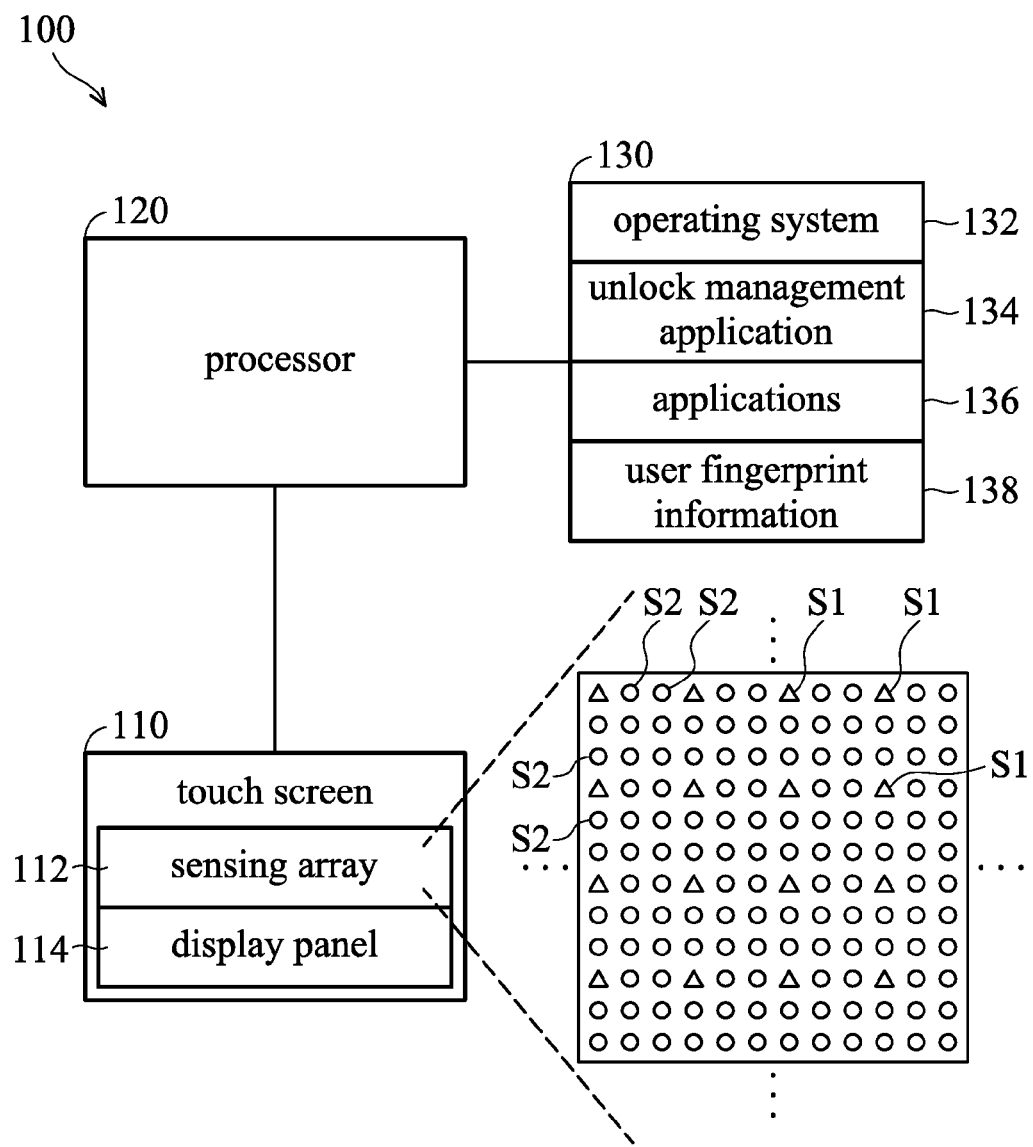
FIG. 1 is a block diagram of an electronic device 100 in accordance with an embodiment of the invention.

FIG. 1 is a block diagram of an electronic device 100 in accordance with an embodiment of the invention. In an embodiment, the electronic device 100 comprises a touch screen 110, a processor 120 and a storage unit 130. The touch screen 110 comprises a sensing array 112 and a display panel 114, wherein the sensing array 112 comprises a plurality of sensors for generating a sensing signal. The sensors can be capacitive sensors or other types of sensors. It should be noted that the resolution of the sensing array 112 can be adjusted according to different operation modes. For example, when the sensing array 112 is utilized to detect touch events, the sensing array 112 will be operated in a touch detection mode (a low resolution mode). When the sensing array 112 is utilized to sense fingerprint images, the sensing array 112 will be operated in a fingerprint sensing mode (a high resolution mode) to capture fingerprint images.

In the fingerprint sensing mode, the sensing array 112 may activate a first number of sensors (e.g. including sensors S1 and S2 in FIG. 1) and generate a fingerprint image according to the sensing signals generated by the first number of sensors. In the touch detection mode, the sensing array 112 may activate a second number of sensors (e.g. including only sensors S1 in FIG. 1) and determine a touch position according to the sensing signals generated by the second number of sensors. The determined touch position, which can be also regarded as a pointer position, is the position where the user's finger touches the display panel 114. Since the first number is larger than the second number, the sensing array 112 has a higher resolution in the fingerprint sensing mode and has a lower resolution in the touch detection mode.

The storage unit 130 is configured to store an operating system 132, an unlock management application 134, applications 136 and user fingerprint information 138 (e.g. biometric points of fingerprints).

In an embodiment, the sensing area of the sensing array 112 is smaller than or equal to the displaying area of the display panel 114. The sensing area of the sensing array 112 comprises a first sensing area and a second sensing area. The first sensing area is operated to sense the fingerprint images of the user when the sensing array 112 is in the fingerprint sensing mode (high resolution mode). The second sensing area is operated to detect the touch events when the sensing array 112 is in the touch detection mode (low resolution mode). The processor 120 may generate a fingerprint image according to the sensing signals generated by the sensors in the first sensing area of the sensing array 112, calculate fingerprint information (e.g. biometric points of the fingerprint image) of the fingerprint image, and compare the calculated fingerprint information with the fingerprint information of the user fingerprint image pre-stored in the storage unit 130 (details will be described later).

Figure 2:
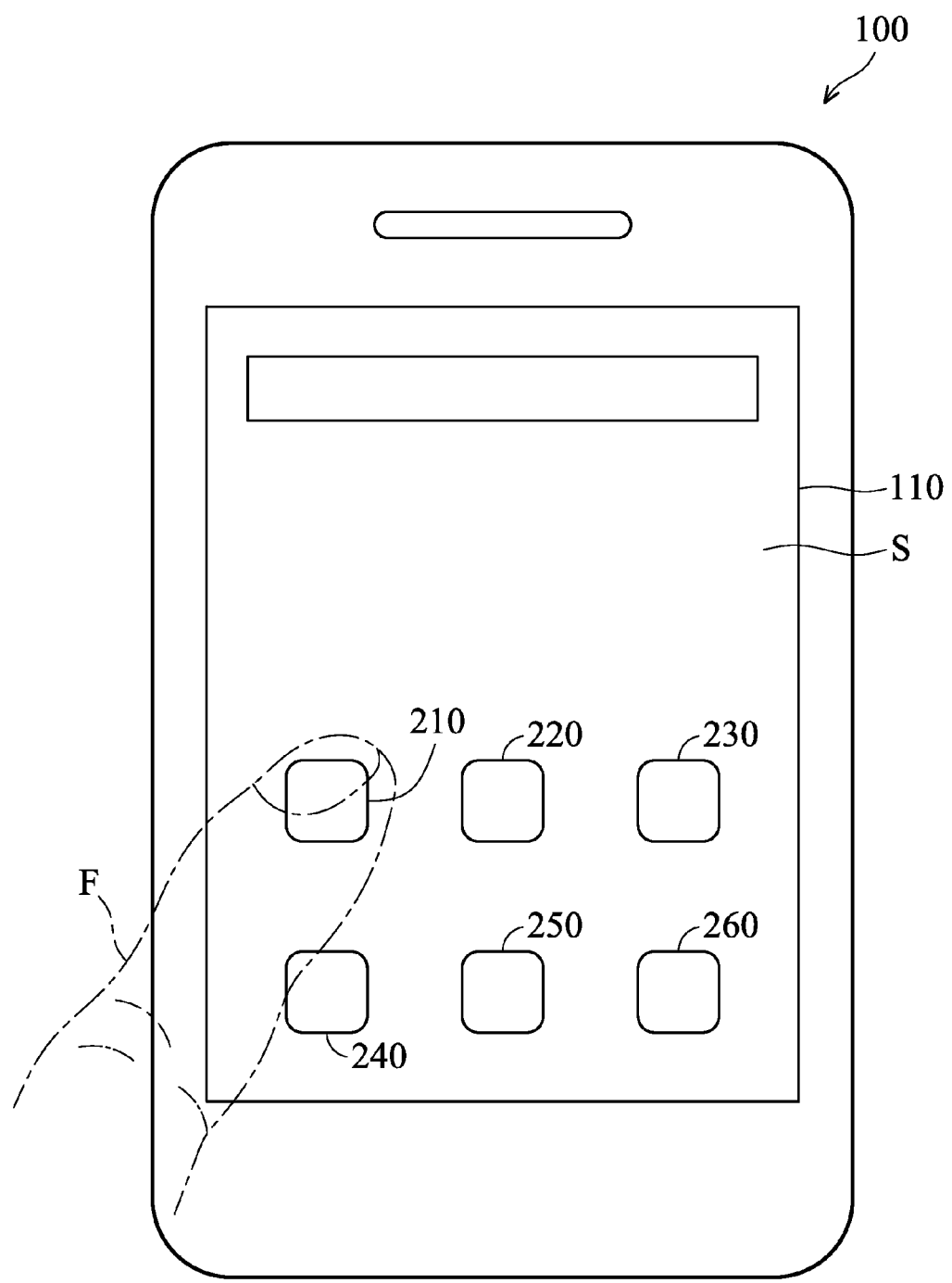
FIG. 2 is a diagram illustrating the operation of the electronic device 100 in accordance with an embodiment of the invention.

FIG. 2 is a diagram illustrating the operation of the electronic device 100 in accordance with an embodiment of the invention. In an embodiment, when the processor 120 is executing the operating system 132, the processor 120 displays one or more icons on the touch screen 110. Each icon corresponds to an application or a specific operation, and is located at a different location on the touch screen 110. Then, the processor 120 executes the unlock management application 134 stored in the storage unit 130, and the user may utilize the unlock management application 134 to initialize at least one of the icons. Thereafter, when the user touches the initialized icon for the purpose of activating the application or operation corresponding to the initialized icon, that application or operation will be activated only if fingerprint recognition is approved. For example, the icon 210 corresponds to an application. During the initialization procedure, the user long-presses the user's finger F on the icon 210 displayed on the touch screen 110, and the first sensing area of the sensing array 112 corresponding to the displaying area of the icon 210 may enter the fingerprint sensing mode to sense a fingerprint image. The processor 120 may store the sensed fingerprint image as a registered user fingerprint image in the storage unit 130. Alternatively, the processor 120 may store the fingerprint information (e.g. biometric feature points of the user fingerprint image) of the sensed fingerprint image into the storage unit 130 as the registered user fingerprint information for later fingerprint verification.

In addition, the first sensing area indicates a specific sensing area of the sensing array 112 which overlaps the displaying area of the icon 210. It should be noted that the first sensing area may be larger than the displaying area of the icon 210. The first sensing area of the sensing array 112 may enter the fingerprint sensing mode (high resolution mode) to sense a fingerprint image. All or a portion of the second sensing area excluding the first sensing area may enter the touch detection mode (low resolution mode) to detect touch events.

After the initialization of the icon 210 is completed, when the user presses the icon 210 on the touch screen 110 (e.g. long pressing the finger on the icon 210), the first sensing area of the sensing array 112 corresponding to the displaying area of the icon 210 may enter the fingerprint sensing mode. As mentioned above, the first sensing area may be equal to or larger than the displaying area of the icon 210. That is, the first sensing area may exactly overlap or include the displaying area of the icon 210.

When the user puts his or her finger on the displaying area of the icon 210 displayed on the display panel 114, the first sensing area of the sensing array 112 corresponding to the displaying area may enter the fingerprint sensing mode to sense and capture the fingerprint image of the user's finger. Then, the processor 120 may calculate and analyze the fingerprint information of the fingerprint image (e.g. the biometric points of the fingerprint image), and determine whether that fingerprint information matches the registered user fingerprint information. When that fingerprint information matches the registered user fingerprint information, the processor 120 determines that fingerprint recognition is approved, and then executes the application or operation corresponding to the icon 210, such as awakening or unlocking the electronic device 100, activating an email application or logging onto a network account.

When the fingerprint information does not match the registered user fingerprint information, the processor 120 determines that fingerprint recognition fails, and will not launch or activate the application or task corresponding to the icon 210. The processor will then ask the user to press his finger on the icon 210 again. It should be noted that the user may move and change the location of each icon displayed on the touch screen 110. If an icon has been initialized and the application or task corresponding to the icon will be activated only when fingerprint recognition is approved, fingerprint recognition will be performed every time when the user wants to activate the application or task corresponding to the icon, regardless of the location of the icon on the touch screen 110. In other words, after the initialization procedure, the activation of the application or operation corresponding to the icon will be associated with specific user fingerprint information. Only when the fingerprint information of the user's finger matches the associated specific user fingerprint information (i.e. the user's fingerprint image matches the associated registered user fingerprint image), the processor 120 will activate the application or execute the operation corresponding to the icon.

Specifically, for each icon displayed on the touch screen 110 of the electronic device 100, the user may initialize the icon so that the application or task corresponding to the icon can be activated or executed only when fingerprint recognition is approved. In addition, the sensing area of the sensing array 112 may exactly overlap the displaying area of the touch screen 110. Accordingly, the user's finger F may perform a specific action on the touch screen 110 to select an icon to start the initialization procedure or perform fingerprint recognition, wherein the specific action may be a long press, a double click, or a triple click. The specific actions can be set in the unlock management application by the user, but the invention is not limited thereto. It should be noted that, after an icon is initialized, when the user presses the initialized icon, the sensing area of the sensing array 112 corresponding to the displaying area of the icon will enter the fingerprint sensing mode and fingerprint recognition will be performed. If fingerprint recognition is approved, the processor 120 will activate and execute the application corresponding to the icon. Thereafter, the sensing area of the sensing array 112 corresponding to the displaying area of the icon may enter the touch detection mode.

Figure 3:
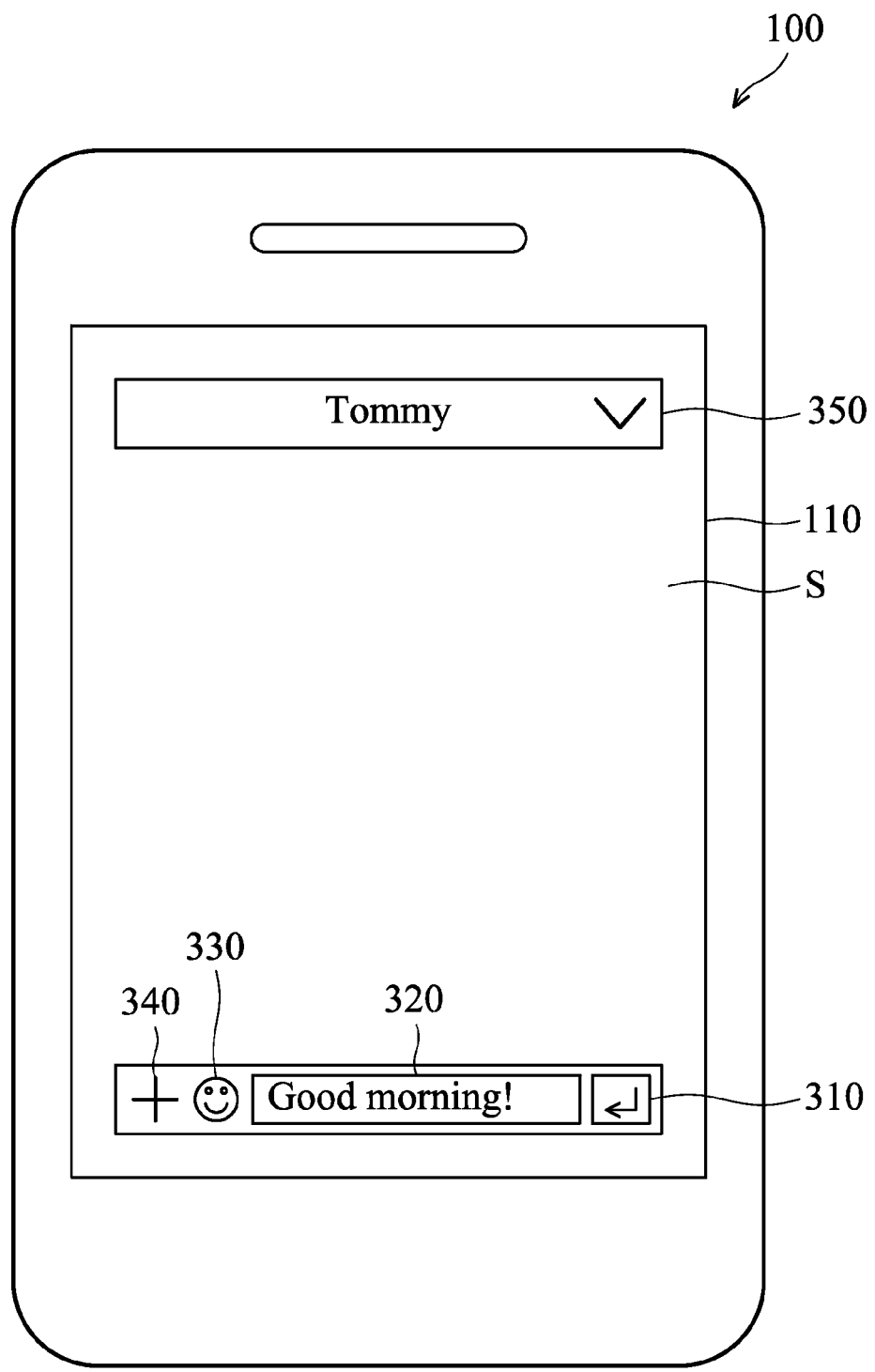
FIG. 3 is a diagram of fingerprint recognition being performed on a location of a touch screen corresponding to a submit button of an application in accordance with an embodiment of the invention.

FIG. 3 is a diagram of performing fingerprint recognition on a location of a touch screen corresponding to a submit button of an application in accordance with an embodiment of the invention. In an embodiment, when the processor 120 executes an application such as an instant messaging application, the processor 120 displays a user interface of the application on the touch screen 110, wherein the user interface comprises a submit button 310. The first sensing area of the sensing array 112 corresponding to the displaying area of the submit button 310 may enter the fingerprint sensing mode. When the user finishes the message input and presses the submit button 310 in order to send out the message, the first sensing area of the sensing array 112 corresponding to the displaying area of the submit button 310 will sense the user's fingerprint for fingerprint recognition. If fingerprint recognition is approved, the electronic device 100 will send out the message. If fingerprint recognition is not approved, the message will not be sent out by the electronic device 100. It should be noted that the sensing area excluding the first sensing area of the sensing array 112 can enter the touch detection mode in the embodiment. For example, the user may choose and touch the dialogue column 320 to input text, or touch or double click the icon 330, 340 or 350 to activate its corresponding application. Specifically, for applications requiring high privacy and security, such as email applications or instant messaging applications, the fingerprint recognition mechanism provided in the invention can be used. It should be noted that the location of the submit button may vary in different applications, and the electronic device 100 may determine the location of the submit button in different applications to perform the aforementioned fingerprint recognition procedure.

Figure 4:
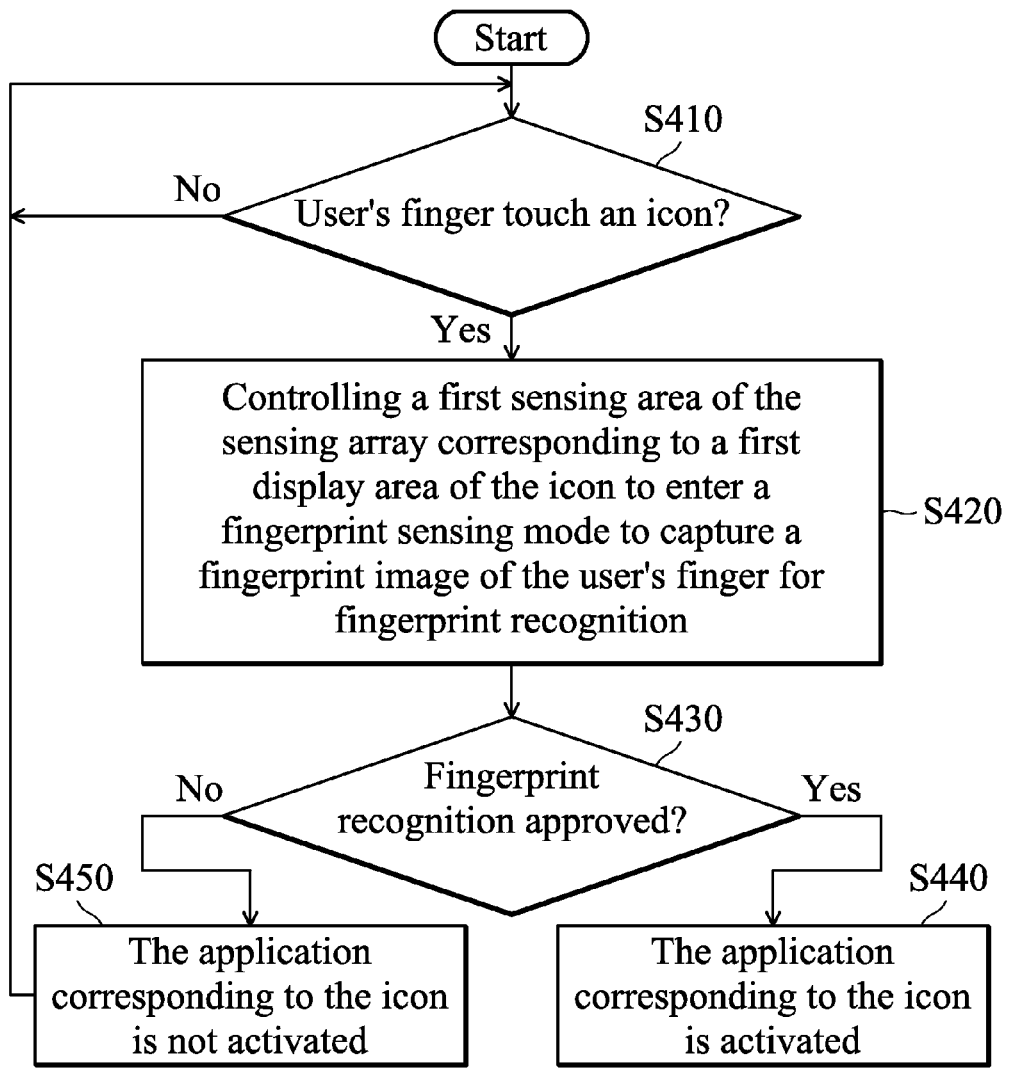
FIG. 4 is a flow chart of the fingerprint recognition method of the electronic device in accordance with an embodiment of the invention.

FIG. 4 is a flow chart of the fingerprint recognition method of the electronic device in accordance with an embodiment of the invention. Referring to FIG. 1 and FIG. 4, in step S410, it is determined whether a user's finger touches on an icon displayed on the display panel 114, wherein the icon corresponds to an application. When it is determined that the user's finger touches on the icon displayed on the display panel 114, step S420 is performed. When it is determined that the user's finger F does not touch the icon displayed on the display panel 114, step S410 is performed. In step S420, a first sensing area of the sensing array corresponding to the displaying area of the icon is controlled to enter a fingerprint sensing mode to capture a fingerprint image of the user's finger for fingerprint recognition. In step S430, it is determined whether fingerprint recognition is approved, i.e. whether the fingerprint image sensed by the first sensing area matches the registered user fingerprint information. If so, step S440 is performed. Otherwise, step S450 is performed. In step S440, it is determined that fingerprint recognition is approved, and an application corresponding to the icon is activated. In step S450, it is determined that fingerprint recognition fails, and the application corresponding to the icon will not be activated. The user may be asked to perform fingerprint recognition again, and step S410 will be performed to detect whether the user's finger touches the icon.

Figure 5:
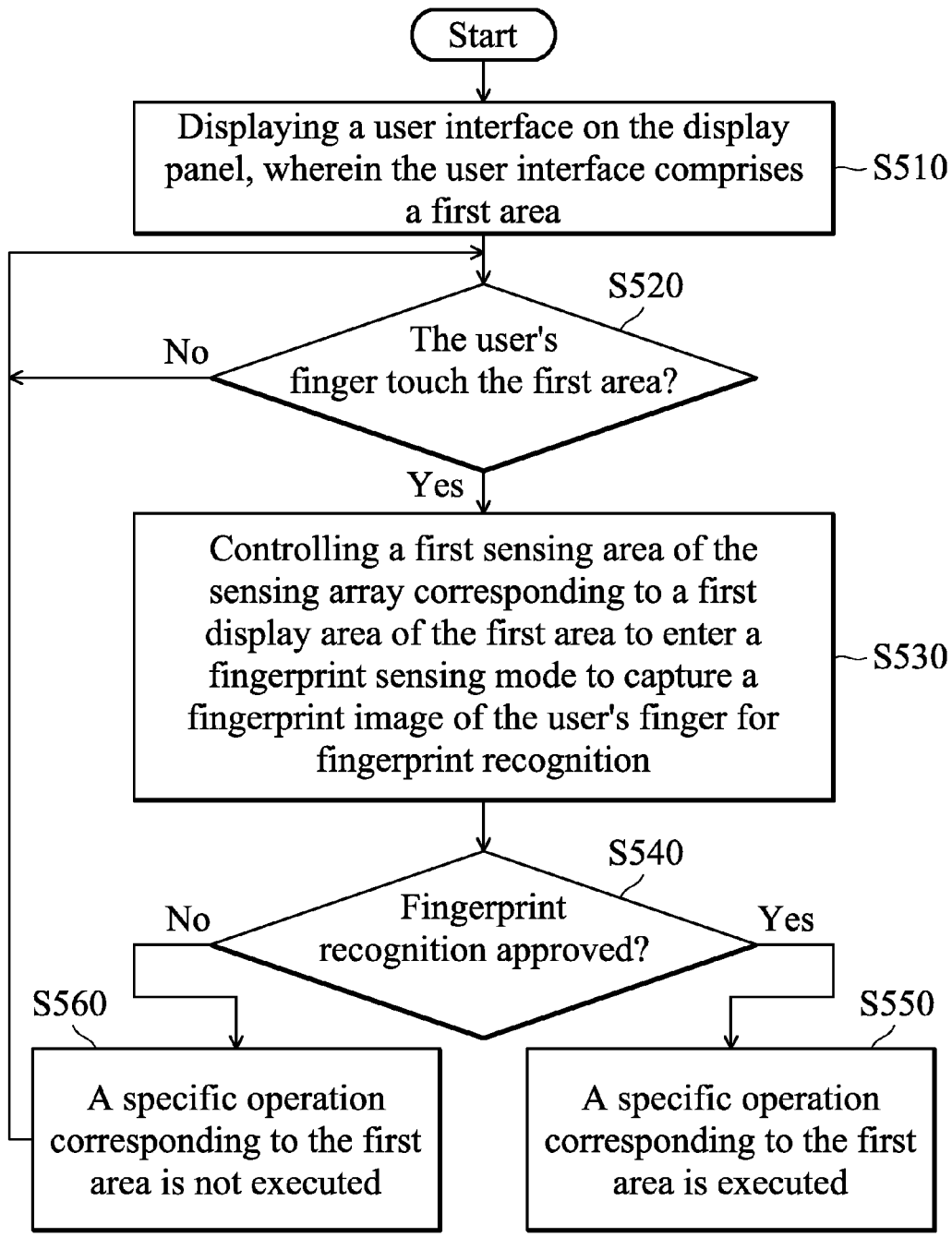
FIG. 5 is a flow chart of the fingerprint recognition method of the electronic device in accordance with another embodiment of the invention.

FIG. 5 is a flow chart of the fingerprint recognition method of the electronic device in accordance with another embodiment of the invention. Referring to FIG. 1 and FIG. 5, in step S510, a user interface is displayed on the display panel 114, wherein the user interface comprises a first area (e.g. a submit button). In step S520, it is determined whether a user's finger touches the first area. If so, step S530 is performed. Otherwise, step S520 is performed. In step S530, a first sensing area of the sensing array 112 corresponding to the first area is controlled to enter a fingerprint sensing mode to capture a fingerprint image of the user's finger for fingerprint recognition. In step S540, it is determined whether fingerprint recognition is approved, i.e. whether the fingerprint information of the captured fingerprint image matches the registered user fingerprint information). If fingerprint recognition is approved, step S550 will be performed. Otherwise, step S560 will be performed. In step S550, a specific operation (e.g. sending out an instant message or an email) corresponding to the first area is executed by the processor 110. In step S560, the processor 110 will not execute the specific operation corresponding to the first area. The user may be asked to perform fingerprint recognition again, and step S520 will be performed to detect whether the user's finger touches the first area.

In view of the above, an electronic device and its associated fingerprint recognition method capable of integrating a fingerprint recognition function into a touch screen are provided. The application corresponding to one icon displayed on the touch screen of the electronic device can be initialized so that the application corresponding to the icon can be activated only when fingerprint recognition is approved. When the user chooses and touches one icon in order to activate the application corresponding to the icon, the application will be activated only after fingerprint recognition is approved. In addition, the electronic device of the invention further determines the displaying location of the submit button of the application on the touch screen, and the task corresponding to the submit button will be performed only when the user's finger pressing the submit button passes fingerprint recognition. Therefore, the invention can promote the privacy and security when the user operates the electronic device.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
 a touch screen, comprising:
 a sensing array comprising a plurality of sensors of the same type, wherein a first number and a second number of the sensors are activated when the sensing array is respectively in a fingerprint sensing mode and a touch detection mode, and the first number is larger than the second number; and
 a display panel, comprising a displaying area, wherein a sensing area of the sensing array is smaller than or equal to the displaying area;
 a processor, for determining whether a user's finger touches an icon displayed on the display panel when the sensing array is in the touch detection mode, wherein the icon corresponds to an application,
 wherein when the processor determines that the user's finger touches the icon displayed on the display panel, the electronic device controls a first sensing area of the sensing array corresponding to a first displaying area of the icon to enter the fingerprint sensing mode to capture a fingerprint image of the user's finger for fingerprint recognition,
 wherein when the processor determines that fingerprint recognition is approved, the processor activates the application corresponding to the icon.

2. The electronic device as claimed in claim 1, wherein the processor further determines whether fingerprint information of the captured fingerprint image matches registered user fingerprint information,
 wherein when the fingerprint information matches the registered user fingerprint information, the processor determines that fingerprint recognition is approved and activates the application corresponding to the icon, and
 wherein when the fingerprint information does not match the registered user fingerprint information, the processor determines that fingerprint recognition is not approved and will not activate the application corresponding to the icon.

3. The electronic device as claimed in claim 1, wherein the first sensing area includes or overlaps the first displaying area, and the area of the first sensing area is larger than or equal to that of the first displaying area.

4. The electronic device as claimed in claim 1, wherein the sensing area excluding the first sensing area of the sensing array is in the touch detection mode to detect a touch event on the touch screen.

5. The electronic device as claimed in claim 1, wherein the processor performs an initialization procedure on the icon so that the application corresponding to the icon is activated only when fingerprint recognition is approved.

6. The electronic device as claimed in claim 5, wherein the processor determines whether the user's finger long-presses the icon displayed on the display panel during the initialization procedure,
 wherein when the processor determines that the user's finger long presses the icon displayed on the display panel, the electronic device controls the first sensing area of the sensing array corresponding to the first displaying area of the icon to enter the fingerprint sensing mode to capture the fingerprint image of the user's finger and stores a registered user fingerprint information according to the captured fingerprint image.

7. A fingerprint recognition method for use in an electronic device, wherein the electronic device comprises a touch screen comprising a sensing array and a display panel, wherein the sensing array comprises a plurality of sensors of the same type, wherein a first number and a second number of the sensors are activated when the sensing array is respectively a fingerprint sensing mode and a touch detection mode, and the first number is larger than the second number, and the display panel comprises a displaying area, wherein a sensing area of the sensing array is smaller than or equal to the displaying area, the method comprising:
 determining whether a user's finger touches an icon displayed on the display panel when the sensing array is in the touch detection mode, wherein the icon corresponds to an application;
 when it is determined that the user's finger touches the icon displayed on the display panel, controlling a first sensing area of the sensing array corresponding to a first displaying area of the icon to enter the fingerprint sensing mode to capture a fingerprint image of the user's finger for fingerprint recognition; and
 when it is determined that fingerprint recognition is approved, activating the application corresponding to the icon.

8. The method as claimed in claim 7, further comprising:
 determining whether fingerprint information of the captured fingerprint image matches registered user fingerprint information,
 when it is determined that the fingerprint information matches the registered user fingerprint information, determining that the fingerprint recognition is approved and activating the application corresponding to the icon; and
 when it is determined that the fingerprint information does not match the registered user fingerprint information, determining that fingerprint recognition is not approved and not activating the application corresponding to the icon.

9. The method as claimed in claim 7, wherein the first sensing area includes or overlaps the first displaying area, and the area of the first sensing area is larger than or equal to that of the first displaying area.

10. The method as claimed in claim 7, wherein the sensing area excluding the first sensing area of the sensing array is in the touch detection mode to detect a touch event on the touch screen.

11. The method as claimed in claim 7, further comprising:
performing an initialization procedure on the icon, so that the application corresponding to the icon is activated only when fingerprint recognition is approved.

12. The method as claimed in claim 11, wherein during the initialization procedure, the method further comprises:
determining whether the user's finger long-presses the icon displayed on the display panel during the initialization procedure;
when it is determined that the user's finger long presses the icon displayed on the display panel, controlling the first sensing area of the sensing array corresponding to the first displaying area of the icon to enter the fingerprint sensing mode to capture the fingerprint image of the user's finger; and
storing a registered user fingerprint information according to the captured fingerprint image.

13. An electronic device, comprising:
a touch screen, comprising:
a sensing array comprising a plurality of sensors of the same type, wherein a first number and a second number of the sensors are activated when the sensing array is respectively a fingerprint sensing mode and a touch detection mode, and the first number is larger than the second number; and
a display panel, comprising a displaying area, wherein a sensing area of the sensing array is smaller than or equal to the displaying area;
a processor, for displaying for controlling display a user interface on the display panel, wherein the user interface comprises a first area,
wherein the electronic device determines whether the user's finger touches the first area displayed on the display panel,
wherein when the electronic device determines that the user's finger touches the first area displayed on the display panel when the sensing array is in the touch detection mode, the electronic device controls a first sensing area of the sensing array corresponding to a first displaying area of the first area to enter a fingerprint sensing mode to capture a fingerprint image of the user's finger for fingerprint recognition,
wherein when the processor determines that fingerprint recognition is approved, the processor executes a specific operation corresponding to the first area.

14. The electronic device as claimed in claim 13, wherein the specific operation is sending out an instant message or an email.

15. A fingerprint recognition method for use in an electronic device, wherein the electronic device comprises a touch screen comprising a sensing array and a display panel, wherein the sensing array comprises a plurality of sensors of the same type, wherein a first number and a second number of the sensors are activated when the sensing array is respectively a fingerprint sensing mode and a touch detection mode, and the first number is larger than the second number, and a sensing area of the sensing array is smaller than or equal to a displaying area of the display panel, the method comprising:
displaying a user interface on the display panel, wherein the user interface comprises a first area;
determining whether the user's finger touches the first area displayed on the display panel when the sensing array is in the touch detection mode;
when it is determined that the user's finger touches the first area displayed on the display panel, controlling a first sensing area of the sensing array corresponding to a first displaying area of the first area to enter a fingerprint sensing mode to capture a fingerprint image of the user's finger for fingerprint recognition; and
when it is determined that fingerprint recognition is approved, executing a specific operation corresponding to the first area.

16. The method as claimed in claim 15, wherein the specific operation is sending out an instant message or an email.

17. The electronic device as claimed in claim 1, wherein the plurality of sensors are capacitive sensors.

18. The fingerprint recognition method in claim 7, wherein the plurality of sensors are capacitive sensors.

19. The electronic device as claimed in claim 13, wherein the plurality of sensors are capacitive sensors.

20. The fingerprint recognition method in claim 15, wherein the plurality of sensors are capacitive sensors.

* * * * *